United States Patent
Kurokawa et al.

(10) Patent No.: US 6,180,558 B1
(45) Date of Patent: *Jan. 30, 2001

(54) MATERIAL FOR EXHAUST GAS PURIFYING CATALYST, EXHAUST GAS PURIFYING CATALYST MADE OF THE MATERIAL AND METHOD FOR PRODUCING THE EXHAUST GAS PURIFYING CATALYST

(75) Inventors: Takahiro Kurokawa; Akihide Takami; Hideharu Iwakuni; Makoto Kyogoku; Shinichi Tanioka; Kenichi Yamamoto; Yoko Kawakami; Hiroshi Murakami; Hirosou Oda; Tadashi Tokuyama, all of Hiroshima (JP)

(73) Assignees: Mazda Motor Corporation, Hiroshima; Tokyo Roki Co., Ltd., Kanagawa, both of (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/829,688

(22) Filed: Mar. 31, 1997

(30) Foreign Application Priority Data

Mar. 29, 1996 (JP) .................................................. 8-077815

(51) Int. Cl.$^7$ ................................ B01J 23/00; B01J 23/02
(52) U.S. Cl. .......................... 502/304; 502/340; 502/341
(58) Field of Search .................................... 502/304, 340, 502/341

(56) References Cited

U.S. PATENT DOCUMENTS 4,965,243 * 10/1990 Yamada et al. ...................... 502/304
5,075,275 * 12/1991 Murakami et al. .................. 502/303

* cited by examiner

Primary Examiner—John F. Niebling
Assistant Examiner—Alexander G. Ghyka
(74) Attorney, Agent, or Firm—Nixon Peabody LLP; Donald R. Studebaker

(57) ABSTRACT

A catalytic base material for an exhaust gas purifying catalyst is produced by impregnating ceria powders with a barium contained solution and heating the ceria particles at approximately 400 to 1100° C. to create and accumulate barium oxides fixed to surfaces of the ceria particles.

15 Claims, 2 Drawing Sheets

MATERIAL FOR EXHAUST GAS PURIFYING CATALYST, EXHAUST GAS PURIFYING CATALYST MADE OF THE MATERIAL AND METHOD FOR PRODUCING THE EXHAUST GAS PURIFYING CATALYST

BACKGROUND OF THE INVENTION

1. Field of the Invention

This invention relates to a catalytic material for an exhaust gas purifying catalyst, an exhaust gas purifying catalyst for use with an internal combustion engine in which the catalytic material is used, and a method of the exhaust gas purifying catalyst.

2. Description of Related Art

In order for automotive vehicles to purify exhaust gases, it has been known to install in an exhaust line a honeycomb type of exhaust gas purifying catalyst which comprises a honeycomb carrier and a catalyst layer coated on the honeycomb carrier. The exhaust gas purifying catalyst coating layer contains therein ceria (i.e. cerium oxide $CeO_2$) particles with barium (Ba) fixed to catalytic particles, activated alumina particles and noble metal components. Such a catalyst is known from, for example, Japanese Unexamined Patent Publication No. 3-207446.

The barium (Ba) is fixed to the ceria particles with an effect of preventing thermal degradation of the ceria particles. In order to firmly fix barium to the ceria particles, ceria powders are mixed with a barium nitrate solution and the mixture is dried. A solid lump of barium nitrate adsorbed-ceria is crushed to particles or powders. The barium nitrate adsorbed-ceria powders are mixed with a solution of palladium chloride and water to prepare slurry of exhaust gas purifying catalyst. After having immersed a catalyst carrier in the slurry and formed a catalyst layer containing barium-fixed ceria and palladium on the catalyst carrier. Finally, the catalyst layer is baked and dried.

While the barium contained in the catalyst has a function of preventing thermal degradation of the ceria, it has been known in the art that the barium is actively utilized for purifying exhaust gases and, in particular, for decomposing nitrogen oxides (NOx) in exhaust gases. That is, in the event where the concentration of oxygen in an exhaust gas is high resulting from lean burning, barium (Ba) supported together with catalytic noble metals such as platinum (Pt) by a alumina supporting material or the like is made to absorb nitrogen oxides (NOx) oxidized with the catalytic noble metals so as to temporarily lower the concentration of oxygen in the exhaust gas and consequently create a reducing atmosphere which removes nitrogen oxides from the barium. In the reducing atmosphere, the catalytic noble metals decompose the removed nitrogen oxides (NOx) by utilizing hydrocarbons (HC) and carbon monoxide (CO) as reduction agents in the exhaust gas.

If barium itself contained in a catalyst encounters thermal degradation, the barium is hard to perform the function of preventing thermal degradation of ceria contained in the catalyst and the function of absorbing nitrogen oxides. When barium is exposed to a high temperature of exhaust gas, the barium dissolves and diffuses in and binds to an adjacent supporting material such as alumina particles. In some cases, the barium forms composite compounds (composite oxides) which causes a decline in the primary functions of barium and, in addition, a decline in the activity of catalytic noble metals.

Japanese Unexamined Patent Publication No. 3-2074461 describes another type of an exhaust gas purifying catalyst. That is, slurry of a mixture of a barium nitrate solution mixed with ceria ($CeO_2$) and boehmite ($Al_2O_3 \cdot H_2O$) and a noble metal solution is applied to a honeycomb carrier. This catalyst coating layer is dried at 130° C and there after baked at 550° C.

Because boehmite includes a portion of alumina $Al_2O_3$, barium (Ba) dissolves and diffuses in and firmly fixes to aluminum (Al) when the catalyst coating layer is exposed to a high temperature of heat.

SUMMARY OF THE INVENTION

It is an object of the invention to provide a catalytic base material for a exhaust gas purifying catalyst which prevents the exhaust gas purifying catalyst from encountering thermal degradation and aggravation of NOx purifying efficiency, and a method of producing the catalytic base material.

This invention has been achieved on the basis of the acknowledge obtained from the results of various experiments and investigations conducted by the inventors of this application that, when a mixture of barium oxides and ceria particles is heated to a relatively high temperature to intentionally create and accumulate coarse-grained barium oxides on surfaces of the ceria particles, the ceria particle and barium oxides are firmly bound, and there are produced no composite compounds like when alumina is used as a catalytic base material, and that consequently the barium does not encounter aggravation of its functions, and that the barium is prevented from dissolving and diffusing in alumina particles or from forming compounds with alumina.

The object of the invention is accomplished by providing a catalytic base material for an exhaust gas purifying catalyst comprising ceria and barium oxides created on surfaces of the ceria particles by heating and fixed onto the ceria particle surfaces. Because the barium oxides are created on the ceria particle surfaces by heating the barium, the barium oxides are firmly fixed to the ceria particles and consequently are prevented from removing from the ceria particles, from dissolving and diffusing in other solid materials or from creating composites even when the catalytic base material is heated to a high temperature until the barium oxides are heated to a temperature high enough to decompose. The catalytic base material is utilized as a supporting material for catalytic metals, and also as an additive for an exhaust gas purifying catalyst. The barium and ceria are made to function as a heat resistant assisting or supplementary catalyst for the catalytic metals.

The catalytic base material for an exhaust gas purifying catalyst is produced by a method including the steps of providing a mixture of a barium solution and cerium contained powders indissoluble in the barium solution, and heating the mixture at a temperature between approximately 400 and 1100° C. to produce barium oxides accumulated on and firmly fixed to surfaces of the ceria particles. Because mixing the cerium contained powders with the barium solution causes barium to adhere evenly to cerium contained powders, barium oxides are created and accumulated on surfaces of ceria particles by heating the mixture. It is essential to heat the mixture at a temperature higher than 400° C. for creation and accumulation of barium oxides. Further, in order to prevent creation and accumulation of excessively coarse-grained barium oxides and ceria particles with decreased specific surface areas which results in degradation of the barium oxides and ceria particles, it is also essential to keep the temperature of heat treatment less than 1100° C. The catalytic base material supporting catalytic metals in an exhaust gas purifying catalyst fulfil effectively the intended function of preventing thermal degradation of the exhaust gas purifying catalyst, adsorption of nitrogen oxides (NOx) and oxygen storage as an assisting or supplementary catalyst. The catalytic base material may be mixed with alumina as a catalytic metal supporting material. In an exhaust gas purifying catalyst having the mixture, catalytic metals are distributed between and supported by the catalytic base material as a first supporting material and the alumina as a second supporting material. This exhaust gas purifying catalyst is made to contain the most part of barium supported by the ceria and is hard to contain the barium supported by the alumina. The exhaust gas purifying catalyst thus produced prevents barium from dissolving and diffusing in the alumina or from oxidizing with the alumina to create compound composites owing to the function of the barium even when it is exposed to a high temperature of heat. An exhaust gas purifying catalyst having a catalytic layer comprising the catalytic base material, alumina and catalytic metals is produced by a method including the steps of preparing slurry of the catalytic base material and alumina, coating the slurry on a catalyst carrier, and impregnating the coating layer with catalytic metals to form a catalyst layer on the catalyst carrier. In the process of producing an exhaust gas purifying catalyst, because the barium is contained as oxides firmly fixed to surfaces of the ceria particles, barium components are prevented from dissolving in the slurry during preparing the slurry. Furthermore, the exhaust gas purifying catalyst thus produced prevents the barium oxides from dissolving and diffusing in the alumina or from oxidizing with the alumina to create compound composites even when it is exposed to a high temperature of heat. In the method of producing the exhaust gas purifying catalyst, ceria powders may be used as the cerium contained powders. The exhaust gas purifying catalyst may contain palladium as one of catalytic metals. This is because the palladium enhances its function as an oxidation catalyst due to the coexistence with the ceria.

Heating the mixture of the barium solution and cerium contained powders at a temperature 800 and 1100° C. is effective to firmly fix barium oxides to ceria particles without causing thermal degradation of these barium oxides and ceria. When heating the mixture of the barium solution and cerium contained powders at a temperature 800 and 1100° C., 0.5 to 45 hours of heat treatment is also effective to firmly fix barium oxides to ceria particles without causing thermal degradation of these barium oxides and ceria.

Desired temperatures for heat treatment are in the same range when determined based on NOx purifying rates of the exhaust gas purifying catalyst as well as based on NOx removal rates of the exhaust gas purifying catalysts. The term "NOx removal rate" used in this specification shall mean and refer to the proportion of NOx removed not only by means of decomposition and but also by means of absorption.

The exhaust gas purifying catalyst is especially effective when applied to a lean burn engine which burns an air-fuel mixture leaner than a stoichiometric air-to-fuel ratio. Here, an air-fuel mixture of an air-to-fuel ratio higher than 16:1 is referred to as a lean air-fuel mixture. Otherwise, an air-fuel mixture which burns and produces an exhaust gas containing oxygen of a concentration higher than 3% is referred to as a lean air-fuel mixture.

Accordingly, owing to barium oxides firmly fixed to ceria particles, the catalytic base material, the exhaust gas purifying catalyst containing the catalytic base material prevents the barium oxides from dissolving and diffusing in the alumina or from oxidizing with the alumina to create compound composites even when it is exposed to a high temperature of heat, keeping the function of barium of preventing thermal degradation of ceria and absorbing nitrogen oxides (NOx) remain effective for a long period of time. The process in which a mixture of a barium solution and cerium contained powders indissoluble in the barium solution is heated at a temperature between approximately 400 and 1100° C. to make barium oxides accumulate on surfaces of the ceria particles produces the catalytic base material containing barium oxides firmly fixed to the ceria particles with the result of performing its own function effectively.

DETAILED DESCRIPTION OF THE SPECIFIC EMBODIMENT

Figure 1:
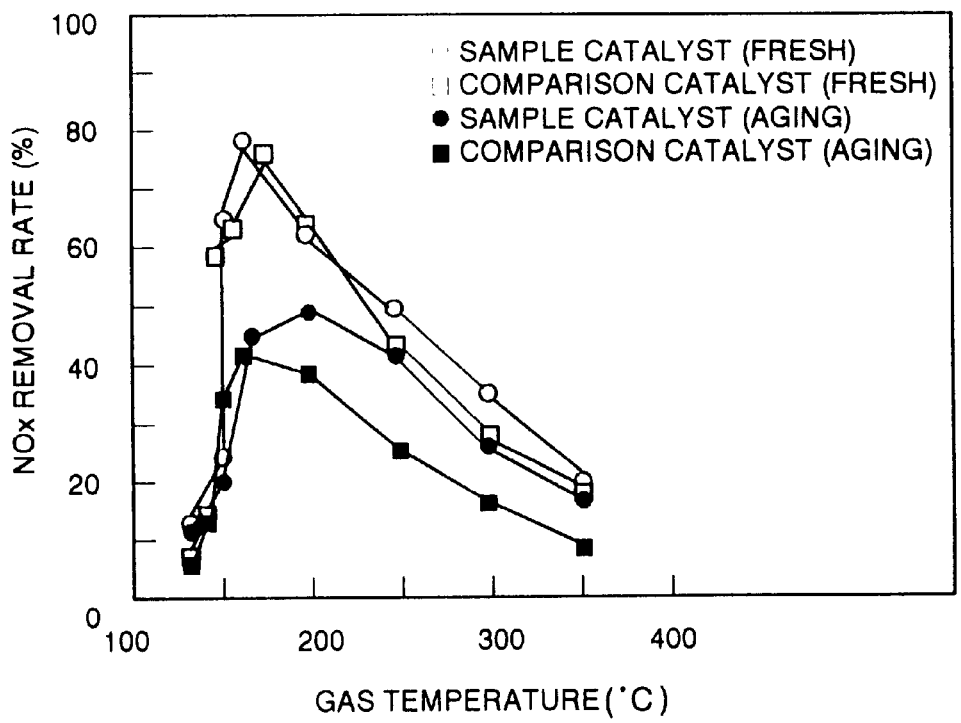
FIG. 1 is a graph showing results of measurements of NOx removal rates with respect to the gas temperature on sample and comparison catalysts before and after aging treatment using an atmospheric pressure fixed bed flow through reactor.

In order to produce barium oxide-fixed ceria particles which is used as a catalytic material of an exhaust gas purifying catalyst, a barium solution is prepared by dissolving a water-soluble barium oxides, such as barium nitrate and barium acetate, in water and ceria powders are mixed with the water solution of barium oxides to impregnate the ceria powders with the water solution of barium oxides. Thereafter, the ceria powder impregnated with the barium solution is heated at a high temperature of approximately 400 to 1,100° C. for 0.5 to 50 hours to produce barium oxides on the surface of a ceria particles as a supporting material for a catalyst. If a lump of the ceria particles is provided, it is crushed to fine particles. The fixed barium oxides comprises CaO for the most part and little $CaO_2$.

The beat treatment temperature is desirabe to be between 400 and 800° C. and, more desirably in view point of producing a high quality catalyst approximately 900° C. A short time of heat treatment is disadvantageous to generation and accumulation of barium oxides and, on the other hand, a long time of heat treatment results in excessively coarse-grained barium oxides and ceria particles and/or causes physical and chemical deterioration of barium oxides and ceria particles. In view of this points, the heat treatment time is desirably 1 to 25 hours. The ceria powders have grain sizes of approximately 0.5 to 50 $\mu$m and, more particularly, approximately 0.5 to 25 $\mu$m.

The barium oxide-fixed ceria particles prepared in the manner described above is used as a supporting material of an exhaust gas purifying catalyst. The different processes can be taken to produce exhaust gas purifying catalysts for internal combustion engines according to types of catalysts. In cases where the catalyst material is made to support platinum (Pt), palladium (Pd), rhodium (Rh), iridium (Ir) and the like as catalytic metals, an impregnation process or a evaporative drying process is taken to make the supporting material to support catalytic metals. The barium oxide-fixed ceria may be mixed with another material, such as alumina ($Al_2O_3$) and zeolite, as a supporting material to support catalytic metals. Otherwise, it may be used as a catalytic additive or an auxiliary catalyst which a supporting material supporting catalytic metals is mixed with. While Gamma-alumina ($\gamma$—$Al_2O_3$) is preferred as the other supporting material, other types of alumina may be used. In order to provide increased heat-resistance, the other supporting material may be mixed with lanthanum (La) and/or zirconium (Zr). Various types of zeolite, such as ZSM5 type, FAU type and β-zeolite, may be available as the other supporting material.

Various forms of catalysts are employed as an exhaust gas purifying catalytic converter for automotive internal combustion engines. For example, catalyst pellets are filled in a column, or a catalyst layer or catalyst layers are coated to a honeycomb carrier. Honeycomb type catalyst converters are widely used as exhaust gas purifying catalysts for internal combustion engines. For producing a honeycomb type exhaust gas purifying catalyst in which the utilization is made of the catalytic material of the invention, a various wash-coating process is employed, in which a honeycomb carrier is immersed in slurry of the catalytic material, and thereafter dried and baked. Specifically, after the catalytic material has been wash-coated to a honeycomb carrier, the catalytic material coating is impregnated with a water solution of a compound of catalytic metals to support the catalytic metals and, thereafter, dried and baked. In this case the supporting material may be wash-coated together with another supporting material. Alternatively, the catalytic material having been made to support catalytic metals is wash-coated to a honeycomb carrier. Before wash-coating, a mixture of the catalytic material and another supporting material may be made to support catalytic metals. A single wash-coating layer or a multiple wash-coating layers may formed. In the case where two or more wash-coated catalyst layers are formed, a layer of the catalytic material or a catalyst containing the catalytic material is formed under a layer of another catalyst, or otherwise may be formed over the other catalytic layer. The other catalyst layer may contain the catalytic material. The catalyst may contain approximately 1 to 50% by weight of barium. In view of achievement of advantageous effect and activity as a catalyst, the catalyst preferably contains approximately 7 to 75% by weight, in particular 10 to 30%, of barium.

EXAMPLE I

The following description will be directed to a catalyst and the process of producing the catalyst according to an embodiment of the invention, which is suitable to purifying nitrogen oxides (NOx) in exhaust gases from an internal combustion engine when a lean fuel mixture is burned. The catalytic converter comprises a honeycomb carrier made of cordierite with a double catalyst coating layers, namely a base catalyst coating layer and an over catalyst coating layer, formed thereon. The base catalyst coating layer is comprised of a mixture of ceria particles supporting barium and palladium, alumina particles supporting barium and palladium and a hydrated alumina binder. The over catalyst coating layer is comprised of a mixture of zeolite particles supporting platinum and rhodium, ceria particles and a hydrated alumina binder. As an example, the weight ratio of the base catalyst coating layer to the over catalyst coating layer was 2:1. The base catalyst coating layer contained an equal weight % of ceria and alumina, and the over catalyst coating layer contained an equal weight % of zeolite and ceria. Each of the base catalyst coating layer and the over catalyst coating layer contained a 10 weight % of alumina binder. The catalyst (the base and over catalyst coating layers) contained a 15 weight % of barium. The catalytic contained 4 grams per one litter of honeycomb (4 g/l) of palladium, and 1.1 grams per one litter of honeycomb (1.1 g/l) of platinum and rhodium with a weight % of 75:1. The particle size of ceria was in a range of 0.5 to 2.5 $\mu$m. Gamma-alumina ($\gamma$—$Al_2O_3$) and the H-type ZSM-5 zeolite (KEIBAN HI ratio of 80) were used.

In the process of producing the catalyst, barium oxide-fixed ceria powders were prepared by impregnating ceria powders with a specified quantity of a barium nitrate solution having a concentration of 3% and heating the ceria powders at 900° C. for 24 hours to create and accumulate barium oxides fixed on the surface of ceria particles. A specified ratio of the barium oxide-fixed ceria powders, Gamma-alumina powders, and alumina powders as a binder were blended together, and the powder blend were mixed with a specified quantity of demineralized water. After wash-coating the slurry of powder blend to a honeycomb carrier to form a base catalyst coating layer, the catalyst coating layer was impregnated with a specified quantity of palladium nitrate.

Separately, after making H-type ZSM-5 zeolite powders to support a specified quantity of platinum and rhodium in a spray-drying manner, a specified ratio of the resultant zeolite powders, ceria powders, alumina powders as a binder were blended together, and the powder blend were mixed with a specified quantity of demineralized water. The powder blend slurry was wash-coated over the base catalyst coating layer to form an over catalyst coating layer. Impurities in each of the base and over catalyst coating layers was less than one weight %.

After having wash-coated the base catalyst coating layer or the over catalyst coating layer, the honeycomb carrier was rotated about its center axis to dry the catalyst coating layer and to spread the catalyst coating layer over inner surfaces of honeycomb cells having rectangular cross-sections. The base catalyst coating layer after the impregnation of palladium nitrate and the wash-coated over catalyst layer were respectively baked at 500° C. for two hours. In the following description, unless particular conditions are specified, baking a coating layer was performed at 500° C. for two hours.

On the other hand, a comparison catalyst was prepared in order to perform comparative tests of the sample catalyst provided according to the embodiment of the invention. The comparison catalyst was almost similar to the sample catalyst of the invention excepting that barium was dispersively supported by both ceria particles and alumina particles. Specifically, after having prepared slurry of a blend of alumina powders, ceria powders, and alumina powders as a binder mixed with a specified quantity of demineralized water, the powder blend slurry was wash-coated in a form of layer to a honeycomb carrier and then, impregnated with a specified quantity of palladium nitrate and barium nitrate in this order to form a base catalyst coating layer. An over catalyst coating layer was formed over the base coating catalyst layer in the same manner as the over catalyst coating layer of the sample catalyst of the invention.

Various comparative estimates were carried out for a study of the catalyst of the invention.

NOx Removal Performance for Regular Lean Mixture Burning

In testing the respective sample catalyst and comparison catalyst for catalytic performance, measurements of NOx removal rates within a specific period of time were made on these sample and comparison catalysts before aging treatment using an atmospheric pressure type of fixed bed flow-through reactor with a simulated exhaust gas produced from lean-burn of a fuel mixture of an air-to-fuel ratio of 22, and flowed at a space velocity of 55,000/h and a temperature of 300° C. Similar measurements were made on these sample and comparison catalysts after aging treatment in the air at 900° C. for 6 hours. The results of measurements are graphically summarized as shown in FIG. 1. As a glance at the graph, it turns out that, while the sample catalyst shows NOx removal rates slightly higher on a side of high temperatures than the comparison catalyst, there is generally no significant difference in NOx purifying rate before the aging treatment between them. However, the test results after the aging treatment demonstrates that the sample catalyst exhibits NOx removal rates significantly higher than the comparison catalyst and the difference in NOx removal rate is especially significant at temperatures between 200 and 300° C. This can be understood as barium enhances the heat resistance of the sample catalyst. That is, it is conceivable that the enhanced heat resistance is ascribable to the fact that barium oxides which are firmly fixed to the cera particles and hardly breakable away from the ceria particles consequently exhibits its function of preventing thermal degradation of the sample catalyst. Compared with the sample catalyst, because, while the comparison catalyst was baked after impregnation with barium nitrate to create barium oxides, the baking of the comparison catalyst was performed under the presence of ceria particles, alumina particles and a alumina binder, barium oxides was distributed into and supported by the ceria and alumina particles and were hard to be firmly fixed to the ceria particles. It is conceivable that aging treatment of the comparison catalyst caused barium to dissolve and diffuse in the alumina particles and alumina binder and further to be oxidized with them, growing to barium oxides which cause the barium to reduce its function of preventing thermal deterioration of the comparison catalyst.

NOx Purifying Performance for Lean Mixture Burning

Figure 2:
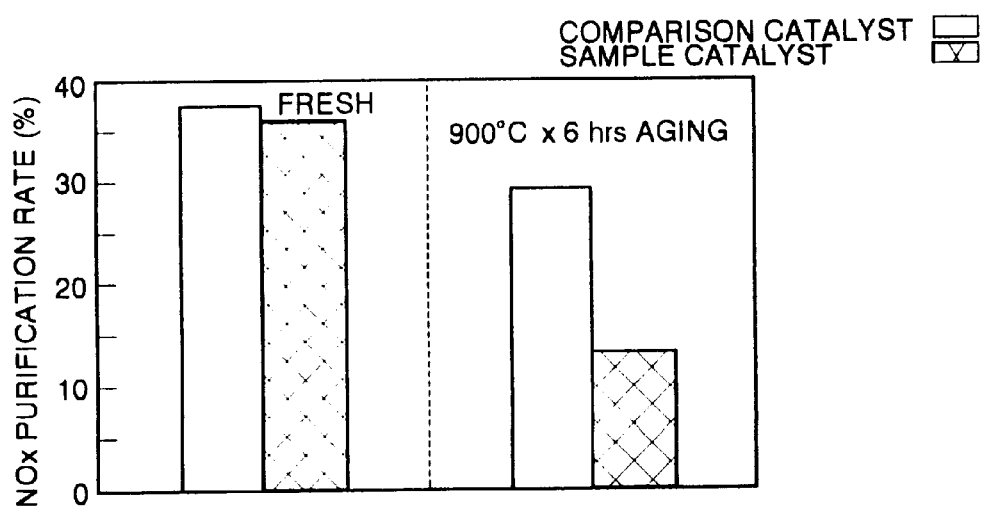
FIG. 2 is a graph showing results of measurements of NOx purifying rates on sample and comparison catalysts before and after aging treatment using an atmospheric pressure fixed bed flow through reactor.

In testing the respective sample catalyst and comparison catalyst for catalytic performance, measurements of NOx purifying rates which take the highest levels within a specific temperature range of 100 to 300° C. were made on these sample and comparison catalysts before and after aging treatment using the atmospheric pressure type fixed bed flow-through reactor with a simulated exhaust gas produced from lean-burn of a fuel mixture of an air-to-fuel ratio of 22, and flowed at a space velocity of 55,000/h. Aging treatment was performed in the air at 900° C. for 6 hours. The results of measurements are graphically summarized as shown in FIG. 2. As a glance at the graph shown in FIG. 2, it turns out that, while there is generally no significant difference in NOx purifying rate before the aging treatment between the sample catalyst and comparison catalyst, the sample catalyst shows NOx purifying rates after the aging treatment significantly higher than the comparison catalyst. It is proved that the sample catalyst after the aging treatment did not cause degradation of barium and did keep barium remain effective in purifying NOx. Because the heat treatment is performed on a coating layer which contains ceria and barium but does not contain catalytic metals, the catalytic metals impregnated in the catalyst coating layer are prevented from dissolving in the ceria and barium and consequently provide improvement of exhaust gas purifying performance of the catalyst.

Heat Treatment Temperature for Catalyst Base Material

In order to produce the catalytic material comprising barium oxide-fixed ceria favorable for the sample catalyst, examinations were made on the grain size of ceria and barium oxides and NOx purifying rate after aging treatment to found favorable heat treatment temperatures. The aging treatment was performed in the air at 900° C for 24 hours. The same type of sample catalysts as tested for the previous evaluations was put to the examinations. Measurements of NOx purifying rates which take the highest levels within a specific temperature range of 100 to 400° C were made on the sample catalysts using the atmospheric pressure type fixed bed flow-through reactor with a simulated exhaust gas produced from lean-burn of a fuel mixture of an air-to-fuel ratio of 22, and flowed at a space velocity of 55,000/h. The results are summarized in the following Table I:

TABLE I

| Temperature (° C.) | 200 | 400 | 600 | 800 | 1000 | 1100 | 1200 |
|---|---|---|---|---|---|---|---|
| CeO2 Grain Size (nm) | 1300 | 3200 | 4900 | 4800 | 6800 | 15000 | 42000 |
| Ba Oxide Grain Size (nm) | 1900 | 4100 | 6600 | 7200 | 14000 | 33000 | 57000 |
| NOx Purifying Rate (%) | 10 | 14 | 16 | 20 | 22 | 18 | 5 |

A glance at Table I reveals that the sample catalyst exhibits relatively high NOx purifying rates in a temperature range of 400 to 1100° C., and in particular in a temperature range of 800 to 1000° C. With respect to grain sizes of ceria and barium oxides, the grain size becomes larger with an increase in temperature. The growth in grain size of ceria and barium oxides is significant in a temperature range of higher than 1000° C. Infirm fixation of barium to ceria particles is taken as the reason for low NOx purifying rates of the sample catalyst subjected to heat treatment at low temperatures. In other words, when the heat treatment temperature is low, barium oxides are hard to firmly fix to ceria particles during generation and accumulation. When treatment temperature is high, coarse-grained ceria and barium oxide particles having reduced specific surface areas and thermal degradation of ceria and barium oxide particles are taken as the reason for low NOx purifying rates of the sample catalyst.

Heat Treatment Time for Catalyst Material

Figure 3:
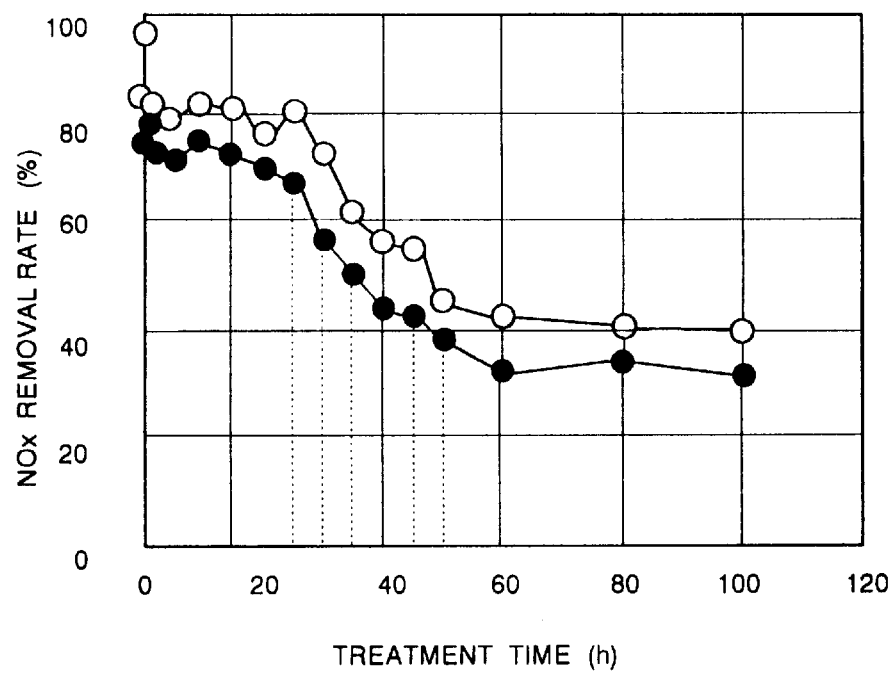
FIG. 3 is a graph showing results of measurements of NOx removal rates with respect to treatment time on sample catalysts before and after aging, for a treatment time of up to 120 hours.
Figure 4:
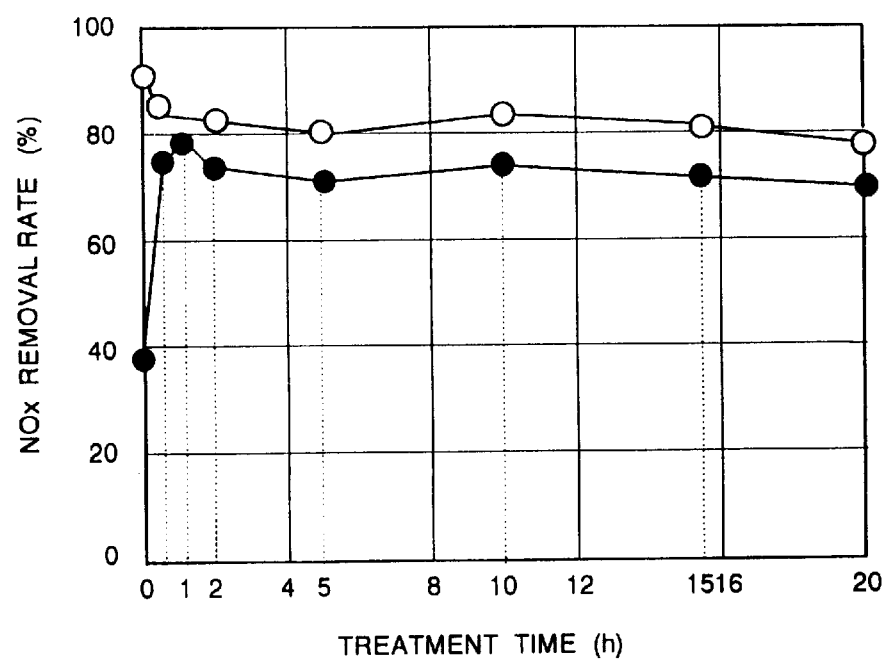
FIG. 4 is a graph showing results of measurements of NOx removal rates with respect to treatment time on sample catalysts before and after aging, for a treatment time of up to 20 hours.

In order to produce the catalytic material comprising barium oxide-fixed ceria favorable for the sample catalyst, examinations were made on NOx purifying rate before and after aging treatment to found favorable heat treatment times. The aging treatment was performed in the air at 900° C. for 24 hours. The same type of sample catalysts as tested for the previous evaluations was put to the examinations. Measurements of NOx purifying rates within a specific period time were made on the sample catalysts using the atmospheric pressure type fixed bed flow-through reactor with a simulated exhaust gas produced from lean-burn of a fuel mixture of an air-to-fuel ratio of 22 and flowed at a space velocity of 55,000/h at 300° C. The results are summarized in graphs shown in FIGS. 3 and 4.

A glance at the graphs reveals that while the sample catalyst subjected to long heat treatment yielded only a slight difference in NOx purifying rate between before and after aging treatment, however, it demonstrated a reduction in NOx purifying rate with an increase in heat treatment time. Judging from the results, the heat treatment time is preferable for the sample catalyst to be performed for a period of time between 0.5 and 45 hours, in particular between 0.5 and 25 to 30 hours.

EXAMPLE II

In order for the sample catalyst to provide improvement of NOx purifying rate of after aging treatment, the catalyst may contain platinum and palladium as catalytic metals in the overcoat catalyst layer. It is thought that the improvement of NOx purifying rate results from creation of an alloy of platinum and palladium which restraints accumulation of platinum particles by heating.

As one example, ZSM5 zeolite was used as a supporting material for platinum. After having wash-coated slurry of ZSM5 zeolite and an alumina binder mixed in a weight ratio of 4:1 to a honeycomb carrier, the coating layer was impregnated with a solution of a catalytic metal mixture of platinum and palladium. As a result of the evaluation of activity of the catalyst coating layer before and after aging treatment, it was proved that aggravation of NOx purifying rate due to aging treatment in the air at 900° C., was decreased. This decrease was significant in a range of mixing ratio of platinum to palladium by weight of 75:1 to 5:1, in particular in a range of mixing ratio of platinum to palladium by weight of 10:1 to 5:1. The catalyst contained 4.5 grams per one litter of honeycomb (4 g/l) of platinum and palladium.

As another example, Gamma-alumina ($\gamma$—$Al_2O_3$) was used as a supporting material for platinum. After having wash-coated slurry of Gamma-alumina and an alumina binder mixed in a weight ratio of 9:1 to a honeycomb carrier, the coating layer was impregnated with a solution of a catalytic metal blend of platinum and palladium mixed in various ratios. As a result of the evaluation of activity of the catalyst coating layer before and after aging treatment in the air at 900° C., it was proved that aggravation of NOx purifying rate due to the aging treatment was decreased. This decrease was significant in a range of mixing ratio of platinum to palladium by weight of 75:1 to 5:1, in particular in a range of mixing ratio of platinum to palladium by weight of 10:1 to 5:1. The catalyst contained 4.5 grams per one litter of honeycomb (4 g/l) of platinum and palladium.

It is to be understood that although the present invention has been described with regard to specific embodiments thereof, various other embodiments and variants may occur to those skilled in the art which are within the spirit and scope of the invention. Such other embodiments and variants are intended to be covered by the following claims.

What is claimed is:

1. A method of producing a catalyst base material with a noble metal supported thereon, said catalyst base material comprising barium, alumina and ceria for an exhaust gas purifying catalyst, said method of producing a catalyst base material comprising the steps of:

mixing a solution of barium with ceria particles indissoluble in said barium solution to prepare a mixture not containing alumina;

heating said mixture at a temperature between approximately 800 and 1100° C. to produce a base material with barium oxides fixed to surfaces of said ceria particles; and mixing said base material with alumina, thereby producing said catalytic base material.

2. A method of producing a catalyst base material as defined in claim 1, wherein said mixture of said barium solution and said cerium particles is heated at a temperature between 800 and 1000° C.

3. A method of producing a catalyst base material as defined in claim 1, wherein said catalytic base material is distributed into a plurality of coating layers.

4. A method of producing a catalyst base material as defined in claim 1, wherein said noble metal is palladium.

5. A method of producing a catalyst base material as defined in claim 1, wherein said mixture is heated at a temperature between approximately 800 and 1100° C. to produce a base material with large-sized barium oxide fixed to surfaces of said ceria particles.

6. A method of producing a catalyst base material as defined in claim 1, wherein said ceria particle has a particle size between 0.5 and 50 $\mu$m.

7. A method of producing a catalyst base material as defined in claim 1, wherein said noble metal is supported on said catalyst base material after producing said catalytic base material.

8. A method of producing a catalyst base material as defined in claim 1, wherein said noble metal is supported on said catalyst base material after coating said catalyst base material on a catalyst substrate.

9. A method of producing a catalyst base material as defined in claim 1, wherein said heating said mixture is made for a time between 0.5 to 45 hours.—

10. A method of producing a catalyst base material of an exhaust gas purifying catalyst of a type used in an exhaust system of a lean burn engine for absorbing NOx in an exhaust gas containing oxygen in excess from the lean burn engine while an air-fuel ratio in a combustion chamber is higher than 22 and releasing and deoxidizing NOx in said exhaust gas into the exhaust gas while said air-fuel ratio is lower than 22, said catalyst base material comprising barium, alumina and ceria and supporting a noble metal thereon, said method of producing a catalyst base material comprising the steps of:

mixing a solution of barium with ceria particles to prepare a mixture not containing alumina;

heating said mixture at a temperature between approximately 800 and 1100° C. to produce a base material with barium oxides fixed to surface of said ceria particles; and mixing said base material with alumina together, thereby producing said catalytic base material.

11. A method of producing a catalyst base material as defined in claim 10, wherein said mixture of said barium solution and said cerium particles is heated at a temperature, between 800 and 1000° C.

12. A method of producing a catalyst base material as defined in claim 10, wherein said catalytic base materials is distributed into a plurality of coating layers.

13. A method of producing a catalyst base material as defined in claim 10, wherein said noble metal is palladium.

14. A method of producing a catalyst base material as defined in claim 10, wherein said mixture is heated at a temperature between approximately 800 and 1100° C. to produce a base material with large-size barium oxides fixed to surfaces of said ceria particles.

15. A method of producing a catalyst base material of an exhaust gas purifying catalyst of a type used in an exhaust system of a lean burn engine for absorbing NOx in an exhaust gas containing oxygen in excess from the lean burn engine while an air-fuel ratio in a combustion chamber is higher than 22 and releasing and oxidizing NOx in said exhaust gas while said air-fuel ratio is lower than 22 to the exhaust gas, said catalyst base material comprising barium, alumina and ceria and supporting a noble metal thereon, said method of producing a catalyst base material comprising the steps of:

mixing a solution of barium with ceria particles to prepare a mixture not containing alumina;

heating said mixture at a temperature between approximately 800 and 1100° C. to produce a base material by fixing barium oxides onto surfaces of said ceria particles so as to disable said barium oxides from dissolving in alumina and forming a composite material with alumina; and mixing said base material with alumina together, thereby producing said catalytic base material.

* * * * *